United States Patent
Neuhaeusler et al.

(10) Patent No.: US 9,662,862 B2
(45) Date of Patent: May 30, 2017

(54) GLASS SUBSTRATE STRIP

(71) Applicant: SCHOTT AG, Mainz (DE)

(72) Inventors: Ulrich Neuhaeusler, Diedorf-Oggenhof (DE); Juergen Vogt, Oberheimbach (DE); Stephan Zachmann, Gau-Odernheim (DE); Christian Göricke, Nienburg (DE)

(73) Assignee: SCHOTT AG, Mainz (DE)

( * ) Notice: Subject to any disclaimer, the term of this patent is extended or adjusted under 35 U.S.C. 154(b) by 190 days.

(21) Appl. No.: 14/424,712

(22) PCT Filed: Aug. 8, 2013

(86) PCT No.: PCT/EP2013/066631
§ 371 (c)(1),
(2) Date: Feb. 27, 2015

(87) PCT Pub. No.: WO2014/032931
PCT Pub. Date: Mar. 6, 2014

(65) Prior Publication Data
US 2015/0224744 A1    Aug. 13, 2015

(30) Foreign Application Priority Data
Aug. 27, 2012  (DE) .......................... 10 2012 215 149

(51) Int. Cl.
*B65D 85/48*    (2006.01)
*B32B 17/06*    (2006.01)
(Continued)

(52) U.S. Cl.
CPC .............. *B32B 17/064* (2013.01); *B32B 3/16* (2013.01); *B32B 7/06* (2013.01); *B65B 15/04* (2013.01);
(Continued)

(58) Field of Classification Search
USPC ..... 206/454, 455, 456, 389, 390, 412, 524.1
See application file for complete search history.

(56) References Cited

U.S. PATENT DOCUMENTS

| | | | |
|---|---|---|---|
| 3,089,801 A | 5/1963 | Tierney et al. |
| 6,815,070 B1 | 11/2004 | Buerkle et al. |
| (Continued) |

FOREIGN PATENT DOCUMENTS

| | | |
|---|---|---|
| DE | 10012261 A1 | 9/2001 |
| DE | 10323303 A1 | 4/2004 |
| (Continued) |

OTHER PUBLICATIONS

English translation of the International Search Report dated Oct. 31, 2013 for corresponding PCT/EP2013/066631.
(Continued)

*Primary Examiner* — Jacob K Ackun
(74) *Attorney, Agent, or Firm* — Ohlandt, Greeley, Ruggiero & Perle, L.L.P.

(57) ABSTRACT

A glass substrate strip is provided includes a large number of thin-glass segments, which have been positioned and fixed on an adherent foil. The thin-glass segments have been fixed on the adherent foil by one of their entire area, their entire edge region, or their edge regions. The glass substrate strip can include lateral transport bands or coding fields. For storage, glass substrate strip is plated in undulating fashion or is rolled up, and it serves not only for transport and storage but also as carrier strip in processing steps for the thin-glass segments.

19 Claims, 5 Drawing Sheets

(51) Int. Cl.
*B32B 7/06* (2006.01)
*B32B 3/16* (2006.01)
*B65B 15/04* (2006.01)
*B65D 73/02* (2006.01)
*C03B 17/06* (2006.01)
*C03B 33/02* (2006.01)

(52) U.S. Cl.
CPC ............ *B65D 73/02* (2013.01); *B65D 85/48* (2013.01); *C03B 17/06* (2013.01); *C03B 17/064* (2013.01); *C03B 33/02* (2013.01); *B32B 2457/20* (2013.01)

(56) References Cited

U.S. PATENT DOCUMENTS

| 2011/0023548 | A1 | 2/2011 | Garner et al. |
| 2011/0171417 | A1 | 7/2011 | Nakamura et al. |
| 2012/0156439 | A1 | 6/2012 | Mori et al. |
| 2013/0045366 | A1* | 2/2013 | Merz ................ B65H 18/28 428/157 |
| 2015/0089796 | A1* | 4/2015 | Kmetich ............ C01B 3/0005 29/611 |
| 2015/0183186 | A1* | 7/2015 | Bigelow ............... B32B 7/06 156/249 |
| 2016/0311722 | A1* | 10/2016 | Ortner ................ C03C 17/30 |

FOREIGN PATENT DOCUMENTS

| DE | 69914761 T2 | 1/2005 |
| JP | 2000252342 A | 9/2000 |
| WO | 8706626 A1 | 11/1987 |
| WO | 02051757 A2 | 7/2002 |
| WO | 03051783 A1 | 6/2003 |
| WO | 2004033197 A2 | 4/2004 |

OTHER PUBLICATIONS

German Office Action dated Apr. 29, 2013 for corresponding German Patent Application No. 10 2012 215 149.4.

English translation Written Opinion of the International Searching Authority dated Oct. 31, 2013 for corresponding PCT/EP2013/066631.

English translation of the International Preliminary Report on Patentability dated Mar. 3, 2015 for corresponding PCT/EP2013/066631, 5 pages.

* cited by examiner

GLASS SUBSTRATE STRIP

The invention relates to a glass substrate strip composed of a large number of thin-glass segments on an adherent foil.

Thin glass is increasingly used for a very wide variety of applications, for example in the fields of consumer electronics, for example as protective covering glass elements for semiconductor modules, for organic LED light sources or for thin or curved display devices, or in the fields of regenerative energies or power engineering, for example for solar cells. Examples here are touch panels, capacitors, thin-film batteries, flexible circuit boards, flexible OLEDs, flexible photovoltaic modules, e-papers and also micro-electro-mechanical systems (MEMS) or micro-optoelectro-mechanical systems (MOEMS). The constantly increasing importance of thin glass in many applications is due to its excellent properties, for example resistance to chemicals, resistance to temperature-change cycles and resistance to heat, impermeability to gases, high electrical insulation capability, balanced coefficient of expansion, flexibility, high optical quality and optical transparency and also high surface quality with very low roughness due to a fire-polished surface on both sides of the thin glass. Thin glass here means thin glass materials with thicknesses below about 1.2 mm down to thicknesses of 15 µm and less.

Because thin glass is flexible, it is increasingly rolled up after production and stored as glass roll or transported as glass roll to conversion processes or to further processing. In a roll-to-roll process, even after an intermediate treatment, for example a coating process or conversion process of the surface, the thin glass can again be rolled up and passed onward to a further use. When the rolling of the glass is compared with storage and transport of flat material, it has the advantage of lower-cost, compact storage, transport and handling during further processing.

It is necessary to avoid damage caused by particulate inclusions between the laps of thin glass in a glass roll. On the one hand, they can scratch the surface, and this risk is in particular increased by any shifting or movement of the laps of thin glass under one another or relative to one another, and on the other hand they can cause pressure points, leading to cracking or fracture. Dirt particles on the thin-glass surface can also create quality- or process-technology-related problems in subsequent coating or conversion processes.

There are various known solutions for winding a continuous glass strip up on a roll in order that it can be coated or subjected to a conversion process in a subsequent roll-to-roll treatment step:

WO 87/06626 proposes the use of a glass roll for a roll-to-roll process for the coating of thin glass. Between the laps of a continuous thin-glass strip, there are one or more laps of a material that does not abrade glass, for example a synthetic foil. The synthetic foil can be a polymer, such as polyester or polyethylene, and can also comprise an impressed pattern in order to protect the coating of metal or of metal oxide on the glass. For the coating of the glass strip, glass strip and synthetic foil are separated from one another. After coating, the glass strip is again wound up with a new synthetic foil as interply.

The cutting of the glass strip to give the appropriate segment dimensions then takes place in a subsequent process step after the coating of the thin glass. A disadvantage here is a correspondingly large amount of cut waste comprising thin glass of which the value has been increased by processing. The value of the thin glass is by this stage markedly higher than that of the unprocessed thin glass material. Furthermore, the cut thin-glass waste that has been coated or has undergone conversion processes cannot always easily be remelted for return to the thin-glass-production process.

U.S. Pat. No. 3,089,801 discloses, for protection purposes and to assist the handling of thin glass as continuous glass strip in subsequent treatment steps, the use of packing paper or aluminum foil which has been coated with a slightly adherent adhesive layer and adheres removably on the glass. This is intended to give the glass greater strength during bending and handling and also to protect it from breakage during roll-up. A disadvantage is that the adhesive layer cannot always be removed without leaving a residue and therefore impairs or prevents the subsequent use of the thin glass.

US 2011/0171417 proposes, for prevention of splintering or breakage of a thin-glass strip, that the thin glass is incorporated by lamination between two plastics layers prior to roll-up to give a glass roll. The proposal comprises a backing layer adhesive-bonded on one side of the thin glass and protruding beyond the edge of the thin glass. On the other side of the thin glass, a protective covering layer is adhesive-bonded releasably over the entire area or only in the region of the edges and with protrusion over the edges, in such a way that the edges have been incorporated by lamination between two plastics layers and the thin glass can then be rolled up. In order to avoid excessive deformation of the backing layer during subsequent release of the protective covering layer, the backing layer is to exhibit less than 10% tensile strain for tensile strength of 50 MPa. Various materials are proposed, but polyethylene and flexible vinyl chloride are excluded inter alia as unsuitable. Again in this proposed solution, adherent residues of the adhesive, or effects caused by the adhesive on the glass surface, are extremely disadvantageous. This solution is moreover attended by increased use of packaging materials and increased packaging cost. There is moreover a high risk of damage to the thin glass during release to mutually adherent plastics layers.

US 2011/0023548 also proposes enclosure of both sides of the thin glass for protection and for handling in subsequent processes. The protective covering of a heat-resistant foil on both sides or else on one side here is in particular restricted to the edge region, but can also extend across the entire area of the thin glass. The thin glass can be a continuous rolled-up glass strip or an individual sheet of glass. The heat-resistant foil proposed is a metal, a silicone, or a polymide, which withstands temperatures up to 300° C. The enclosing material is molded directly onto the thin glass or adhesive-bonded with an acrylic adhesive. A disadvantage is that this involves a bond that is difficult to release. When the protective enclosing material is removed there is a high risk of undesired damage to the thin glass. In the case of protection and enclosure of individual sheets of thin glass, the enclosing material can be used to stack same, whereupon the enclosing material at the edge region serves as spacer, thus producing an air gap between the thin-glass layers. A disadvantage here is that the thin-glass layers can vibrate or sag and are thus exposed to risk of breakage. During prolonged storage, furthermore, the aging effects that occur on the surface of the thin glass in regions in contact with a protective foil differ from those in regions having no contact with a protective foil. This can have undesired and visible effects during subsequent coating or use of the glass.

It is therefore an object of the invention to eliminate the disadvantages described above and to provide low-cost, easily operable protection for this glass during transport and during handling in subsequent processes.

The invention achieves said object by using the features of claim 1 and of claims 18 and 19. Other advantageous embodiments of the invention are described in dependent claims 2 to 17.

The invention provides a glass substrate strip on which at least two, preferably a large number, of individual thin sheets of glass, i.e. thin-glass segments, have been fixed on a strip of an adherent foil. Thus fixed, the individual sheets of thin glass can pass through subsequent processing steps, with secure retention and protection. The adherent foil serves here as carrier strip.

Examples of processing steps are grinding, polishing, washing, printing, a photolithographic process, the application of one or more coatings such as an antireflective coating, easy-clean coating, or electrically conductive coating, a lamination process, or else the provision of, for example, an electronic component. The glass substrate strip of the invention has the advantage of free accessibility of the entire surface on one or other side of the thin-glass segment, simple, low-cost handling of a large number of individual segments made of thin glass with the possibility of integrated low-risk packaging system in the form of a roll or of an undulating stack. Furthermore, the thin glass has protection in the event of breakage or of splintering, and resultant splinters or fragments cannot therefore disrupt any subsequent process step, but instead are reliably retained on the adhesive carrier strip.

It is moreover easily possible to release the thin-glass segments in turn from the adhesive carrier foil, without leaving residues on the glass surface. In the packaged condition, as roll or stack, both surfaces of the thin-glass segments are in contact in the same manner with the foil, and undesired differences in aging or alteration of the glass surface, cannot therefore occur. In the packaged condition, the adherent foil serves as protection for transport and storage of the sheets of thin glass.

Another advantage of the invention is that the individual sheets of thin glass are cut to size in specified dimensions from the glass strip before its value has been increased by further processing. The cut waste therefore still has low added value and can moreover be returned without difficulty as raw material to the melting and production process that produces the thin glass. Expensive subsequent processes are carried out only on the individual relatively small thin-glass segments. However, in the invention they can take place by the low-cost roll-to-roll process, as is the case for the continuous glass strip. They have been securely fixed here, and during processing require none of the rearrangement that, in the case of thin glass, always implies a high risk of breakage and cracking.

The thin glass is produced in a known manner by the down-draw process or in the overflow down-draw process (cf. by way of example WO 02/051757 A2 for the down-draw process and WO 03/051783 A1 for the overflow down-draw process). The shaped and drawn continuous strip is wound up and cut to length to give a glass roll. The thin-glass segments are detached from the glass roll or from the glass strip directly after unrolling.

The thin glass here can be composed of any suitable type of glass, in particular of a borosilicate glass, aluminoborosilicate glass, soda-lime glass, aluminosilicate glass, or a lithium-aluminum silicate glass. The surface is a very smooth fire-polished surface, in order to reduce breakage risk and cracking during roll-up and in order to ensure good adhesion on the adhesive carrier foil. It has been found that, in particular in the thickness range below 100 μm, a particularly smooth surface is created by thin drawing of low-alkali glasses.

The thickness of the thin-glass segments which in the invention are positioned and fixed on the glass substrate strip is usually less than or equal to 350 μm, preferably less than or equal to 100 μm, with preference less than or equal to 70 μm, with particular preference less than or equal to 50 μm, in particular with preference less than or equal to 25 μm, and at least 5 μm, preferably at least 10 μm, particularly preferably at least 15 μm. Preferred thicknesses of thin glass are 15, 20, 25, 30, 35, 50, 55, 70, 80, 100, 130, 145, 160, 190, 210, 280 μm.

The large surfaces of the thin-glass segments can have any desired shape, preference being given to square, rectangular or round segments.

The thin-glass segments preferably have a fire-polished surface on at least one surface of their two sides, and preferably have a fire-polished surface on the surface of both sides.

For secure fixing or adhesion of a thin-glass segment on the adherent foil and for problem-free release of the adherent foil from the thin-glass surface, the squared average roughness value (RMS) Rq on the surface of at least one of its two sides is preferably at most 1 nanometer, preferably at most 0.8 nanometer, particularly preferably at most 0.5 nanometer. The average roughness depth Ra on the surface of at least one of its two sides is at most 2 nanometers, preferably at most 1.5 nanometers, particularly preferably at most 1 nanometer, based in each case on a measurement length of 670 μm. In one preferred embodiment, these roughness values characterize the surface of both sides of the thin-glass segments. However, in particular that surface of a thin-glass segment that adheres on the adherent foil is characterized by said roughness values.

In one preferred embodiment, the adhesion of the foil to the glass surface on one side of the foil and/or of the thin glass is higher than on the other side, or the static friction of the adherent foil on the glass surface is higher on one side of the adherent foil and/or of the thin glass than on the other side. This has the advantage that when the glass substrate strip is rolled up or is plated that opposite surface of the thin glass that is not in contact with the adherent foil and that comes into contact with the next lap of the adherent foil adheres relatively weakly thereto. This facilitates repeated roll-up of the glass substrate strip, or its release from a stack. The bond between adherent foil and the protected glass surface can thus remain unimpaired and stable on repeated roll-up of the glass substrate strip or on its release from a stack.

That side of the adherent foil that exhibits relatively high adhesion on interaction with a fire-polished thin-glass surface and that therefore is in contact with a thin-glass surface in the rolled-up condition of the glass substrate strip exhibits a static friction force $F_S$ in the range greater than 20 N, preferably greater than 50 N. The expression static friction force means the force maximum that must be overcome in order to move the adherent foil relative to the thin-glass surface.

That opposite side of the adherent foil that, on interaction with a fire-polished thin-glass surface, exhibits relatively low adhesion, and that is in contact with a thin-glass surface only in the rolled-up or plated condition of the glass substrate strip, exhibits a static friction force $F_S$ in the range from 0.10 to 10 N, preferably from 0.10 to 2 N. That opposite side of the adherent foil which, on interaction with a fire-polished thin-glass surface, exhibits relatively low adhesion moreover exhibits a frictional force $F_D$ in the range from 0.10 to 5 N, preferably from 0.10 to 1.5 N. The expression frictional force means the average force required for relative movement between intervening material and glass surface over a test distance once static friction has been overcome.

The values for the static friction $F_S$ and the friction force $F_D$ are respectively those corresponding to measurement in accordance with DIN EN ISO 8295 in a universal electromechanical tester from Schenk-Trebel under standard conditions at 23° C. and 50% relative humidity in accordance with DIN 50 014, using a normal force of 1.96 N.

The material for the adherent foil is any material which is suitable on at least one surface as adherent foil. Preference is given to polyethylene (PE), an example being a coextruded polyethylene adherent foil, or a polyvinyl chloride (PVC), for example a flexible PVC adherent foil. A composite foil can also be involved here, where one foil of the composite is preferably a PE or PVC, an example being a composite foil made of a polyethylene terephthalate (PET) and flexible polyvinyl chloride (flexible PVC).

The thickness of an adherent foil is in the range smaller than 6 mm, preferably in the range smaller than or equal 2 mm, particularly preferably smaller than or equal to 1 mm, very particularly preferably smaller than or equal to 0.5 mm, in particular in the range from 30 to 350 µm, preferably from 60 to 200 µm.

The term adherent foil means a flexible plastics foil with very smooth lower side which adheres, without adhesive, on a thin-glass surface. It is unlike an adhesive foil in that, even after a prolonged period, it can be peeled very rapidly from the substrate, without aids and without leaving residues. The adhesion, or the attractive force, derives mainly from what are known as Van der Waals forces, i.e. weak attractive forces which exist between the molecules in the surface of the thin glass and of the adherent foil and which become stronger as the surfaces become smoother.

In one embodiment, the adherent foil is an electrostatically charged adherent foil.

In one embodiment, the adherent surface of the adherent foil has a microfine structure which assists adhesion on the thin-glass surface, an example being a structure in the form of very small suckers.

In one embodiment, the material for an adherent foil can be an adherent textile, such as a woven polyester fabric, to which an adherent coating has been provided on the area for contact with the thin glass. Said coating can also be an adhesive which ensures that the adherent textile can be peeled, if necessary repeatedly, over the entire area. An advantage here is that by way of example during treatment or processing of the thin-glass sections in a roll-to-roll process it is possible to maintain a certain tension applied to the glass substrate strip without any deformation of the carrier foil. It is thus possible to achieve exact positioning of the thin-glass segments.

In one embodiment for applications in a subsequent processing step carried out at relatively high temperatures, for example at from 150 to 500° C., the adherent foil can also be a metal foil, such as an aluminum foil, to which an adherent coating has been provided on the area for contact with the thin glass. Said coating can also be an adhesive which ensures that the adherent foil can be peeled, if necessary repeatedly, over the entire area.

This type of adherent coating is in particular a butyl rubber or silicone rubber, but can also by way of example be a silicone gel, urethane rubber, natural rubber, butadiene rubber, ethylene-propylene rubber, chloroprene rubber, nitrile rubber, nitrile-isoprene rubber, acrylic rubber, fluororubber, chlorosulfonated polyethylene, chlorinated polyethylene or epichlorohydrin rubber.

The adherent foil can also have been coated on one side with by way of example an outer foil, paperboard, a non-adherent plastic, a woven fabric or a metal film. Coating with a woven fabric especially ensures stable transport during subsequent process steps and prevents undesired stretching, elongation or deformation of the adherent carrier foil in transport during the process steps, and also facilitates subsequent peeling of the thin-glass sheets from the adherent foil. The coating can also be a compressible material, such as a compressible paperboard or a foam foil, e.g. made of a polyolefin foam, in particular of a crosslinked polyolefin foam, or else can be a foam foil made of polyethylene or polyurethane. It is thus possible to create particular advantages for the glass substrate web as roll material, in that the roll is intrinsically stable with respect to lateral displacement, and in that the thin glass substrates in the roll have advantageous protection and storage. The coating can respectively be a protective covering which has been bonded by adherent force to the foil and can be peeled therefrom, or can respectively be a permanently applied non-peelable coating.

The thickness of a coated adherent foil of this type is in the range smaller than 6 mm, preferably in the range smaller than or equal to 2 mm, particularly preferably smaller than or equal to 1 mm, very particularly preferably smaller than or equal to 0.5 mm.

In one very preferred embodiment, the thickness of the adherent foil has been adapted appropriately in such a way that, in the rolled-up condition of a thin-glass substrate and of an adjacent foil, the location of the neutral phase between tensile stress and compressive stress is in the adherent layer that bonds the two plies. This frees both surfaces from forces and prevents any lasting undesired curvature of the thin-glass segments when the glass substrate strip is unrolled. To this end, the thickness of the adherent foil (Tp) is determined as follows with reference to the thickness of the thin-glass substrates (Tg), the Poisson ratio of the adherent foil (vp), the Poisson ratio of the thin-glass substrates (vg), the modulus of elasticity of the adherent foil (Ep) and the modulus of elasticity of the thin-glass substrates (Eg):

$$Tp = \sqrt{\frac{Eg}{Ep} \times \frac{1-vp^2}{1-vg^2}} \times Tg$$

The adherent foil can cover the entire first or second surface of the thin-glass segments. This provides the advantage that the thin-glass segments can be treated on their entire first, or on their entire second, surface in one process step. In another embodiment, however, the adherent foil can also cover only the entire edge region, or sections of the edge region, of the first and/or second surface of the thin-glass segments, for example the edge region of two opposite edges of the thin-glass segments. This provides the advantage that the thin-glass segments can be treated simultaneously on their first and second surface in one process step.

In each embodiment, the adherent foil can protrude respectively beyond the edge region of the first and second surface of the thin-glass segments perpendicularly to the longitudinal direction of the glass substrate strip and form a protruding region. The protruding region here can also serve as transport band for steering the glass substrate strip or moving same by use of a drive device. By way of example, the glass substrate strip can be driven and moved with the aid of one or two pressure rolls which interact in such a way as to exert a frictional driving force or frictional steering force on the protruding region. The protruding region can also have cutouts, in particular punched holes, into which the teeth of a gearwheel or toothed strip interlock and exert a driving force which drives and moves the glass substrate strip.

The projecting region can also have a coding by way of which the position and specification of the glass substrate strip or of the individual thin-glass segments can be read. However, it is also possible that the coating has been attached perpendicularly with respect to the direction of running of the strip, i.e. transversely with respect to the glass substrate strip between thin-glass segments fixed on the adherent foil. The coding can be attached directly on the adherent foil, or there can be specific coding fields attached on the adherent foil to which the coding is applied, for example printed. The coding fields can be printed or adhesive-bonded label fields which are easily inscribable or printable. Coding can also optionally be printed or adhesive-bonded thereto. The adhesive bonding can utilize the adherent property of the adherent foil.

For storage or transport, the entire glass substrate strip is layered in undulating fashion or is rolled up to give a compact roll. The product layered in undulating fashion protects the thin-glass segments from adverse effects during storage, since the segments are not exposed to any bending forces, i.e. tensile forces. The roll has the advantage that the subsequent treatment or processing of the thin-glass segments in a roll-to-roll process is convenient, and a certain tension can be applied continuously to the glass substrate strip here, for exact orientation of the thin-glass segments.

The invention also includes a process for the production of a glass substrate strip, comprising the steps of the production of a thin glass strip by the down-draw or overflow down-draw process, detachment of thin-glass segments from the thin glass strip, positioning and contacting the thin-glass segments on the adherent foil.

The thin glass strip is produced continuously in a known manner by a down-draw or overflow down-draw process. Before thin-glass segments are detached from the thin glass strip this can also be subjected to a preconversion process, for example via detachment of the lateral edge sections, or a process for the removal of thermal stresses. It can also be wound up onto a roll. The detachment of the thin-glass segments from the thin glass strip can then take place directly from the continuous strip after the drawing process, or from a glass roll. The detachment is achieved by using known technologies, e.g. a laser-separation process, or by means of a cutter, via scoring and fracture. The detached thin-glass segments are then laid out by means of a gripping and positioning device, such as a robot arm, with precise positioning onto the prepared adherent foil. To this end, the adherent foil is wound from a roll, and, with use of slight pretension, forms a flat smooth area to receive the thin-glass sections. A pressure roll can optionally then be used to bond the adherent foil more securely to the surface of the thin-glass segments. The adherent foil to which the thin-glass segments have been applied is then rolled up or plated in undulating form.

Prior to the contact between the thin-glass segments and the adherent foil, these are free from dirt, dust, and grease, and in particular this situation prevails directly after the drawing of the thin glass. Prior to adhesive-bonding, the adherent foil is spread out in a form that is flat and clean, in order that the thin-glass segments can be applied over the entire area and without creasing. Folds in the foil would lead to undesired regions of pressure, for example subsequently in the rolled-up condition. If there is a backing paper bonded to the adherent foil, this paper is peeled away in the region of application of the respective thin-glass segments that are to be applied, and by way of example is taken up onto a roll.

The contact between the thin-glass segments and the adherent foil preferably takes place under dry conditions. However, if the intention is to permit orientation, correction, and if necessary also repeated lifting, of the thin-glass segments on the adherent foil it is also possible that the contact takes place under wet conditions. In this case, the surfaces of the thin-glass segments and of the adherent foil that are to come into contact are moistened uniformly with a specific mounting liquid or with a solution made of water and of a flushing agent. After contact has been achieved with the thin-glass segments, the adherent foil is subjected, section by section, to pressure, generally by means of one or more pressure rolls, and the air, and also where appropriate the liquid, under the foil is removed. In order to ensure the best possible adhesion of the adherent foil and to avoid the formation of bubbles, in particular when a pressure-sensitive adhesive is used, the contacting temperature is from 5 to 45° C., preferably from 10° C. to 25° C.

Particularly in the case of a glass substrate strip which is rolled up to give a roll, the location of the neutral phase between tensile stress and compressive stress in the rolled-up condition is placed into the adherent layer. This prevents any lasting undesired bending of the thin-glass segments during the unrolling of the glass substrate strip. In order to position the neutral phase into the interface between thin glass substrate and adherent foil, the modulus of elasticity, the Poisson ratio and the thickness of the adherent foil and of the thin-glass segments are adapted appropriately to one another. The following mathematical relationship applies for the determination of the thickness of the adherent foil:

$$Tp = \sqrt{\frac{Eg}{Ep} \times \frac{1-vp^2}{1-vg^2}} \times Tg$$

where $T_p$ is the thickness of the adherent foil, $T_g$ is the thickness of the thin glass substrates, $v_p$ is the Poisson ratio of the adherent foil, $v_g$ is the Poisson ratio of the thin glass substrates, $E_p$ is the modulus of elasticity of the adherent foil and $E_g$ is the modulus of elasticity of the thin glass substrates.

The invention also includes the use of a glass substrate strip for the treatment or further processing of the first and/or second surface of the thin-glass segments in a continuous process. The advantage here is that the following are avoided: the need to subject the entire glass strip to a corresponding treatment or a corresponding process to increase its value and, in the subsequent cutting process, production of glass waste that is expensive and which sometimes is also impossible to remelt. The complication of a cutting process carried out on a glass strip of length 1000 m or more at this stage of the process chain is also avoided, and the customer can be supplied directly with ready-to-use thin-glass segments. Examples of treatment or further processing of one or both surfaces of the thin-glass segments here are grinding, lapping, polishing, washing, printing, a photolithographic process, application of one or more coatings, such as an antireflective coating, easy-clean coating, anti-fingerprint coating, antiglare coating, or electrically conductive coating, a lamination process, or else the provision of, for example, an electronic component.

The further information and examples below are intended to provide a more detailed description of the invention.

FIG. 1 shows round (FIG. 1a) and square (FIG. 1b) thin-glass segments on an adherent foil with full-area contact of a first or second thin-glass surface.

FIG. 2 shows round (FIG. 2a) and rectangular (FIG. 2b) thin-glass segments on an adherent foil with contact of the respective entire edge region of a first or second thin-glass surface.

FIG. 3 shows round (FIG. 3a) and rectangular (FIG. 3b) thin-glass segments on an adherent foil with contact of two opposite edge regions of a first and second thin-glass surface.

Figure 1A:
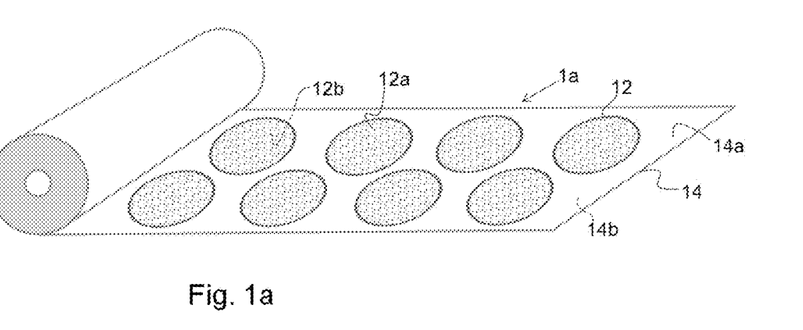

FIG. 1a shows by way of example a glass substrate strip 1a with positioned and fixed round thin-glass segments 12 for manufacture of wafers. The thin-glass segments 12 have been fixed on an adherent foil 14 with full-area contact of a first thin-glass surface 12b. The second thin-glass surface 12a is uncovered, facing upward, and comes into contact with the adherent foil 14, i.e. with the surface 14b of the adherent foil, only when the glass substrate strip 1a is rolled up. The thickness of the thin-glass segments is 0.06 mm. The adherent foil 14 is a coextruded adhesive polyethylene foil as is by way of example supplied as PE-CLING Protect by Molco Deutschland GmbH, Schwerte. The thickness of the adherent foil was 110 μm, and the position of the neutral phase between tensile stress and compressive stress in the rolled-up condition was therefore in the adherent layer between the surface 14a of the adherent foil and the surface 12b of the thin-glass segments. The adherent foil 14 has an adhesive side 14a exhibiting a static friction force greater than 20 N which comes into contact with the first surface 12b of the thin-glass segments 12, and an opposite side 14b exhibiting a static friction force of from 0.5 to 0.7 N which, when the glass substrate strip 1a is plated in an undulating fashion or is rolled up, comes into contact with the second surface 12a of the thin-glass segments 12.

The Poisson ratio of the adherent foil was 0.45, the Poisson ratio of the thin-glass segments was 0.23, the modulus of elasticity of the adherent foil was 0.2 GPa and the modulus of elasticity of the thin-glass substrates was 73 GPa. In other variants of the example with reference to FIG. 1a, the thickness of the adherent foil was determined as follows in accordance with the relationships described above, taking into account the following thicknesses of the thin-glass segments; in the rolled-up condition the position of the neutral phase between tensile stress and compressive stress was respectively in the adherent layer between the surface 14a of the adherent foil and the surface 12b of the thin-glass segments.

| Thickness of thin-glass segments [mm] | Thickness of adherent foil [mm] |
| --- | --- |
| 0.01 | 0.17 |
| 0.02 | 0.35 |
| 0.03 | 0.53 |
| 0.04 | 0.70 |
| 0.05 | 0.88 |
| 0.06 | 1.10 |
| 0.07 | 1.23 |
| 0.08 | 1.40 |
| 0.09 | 1.58 |
| 0.1 | 1.75 |
| 0.11 | 1.93 |
| 0.12 | 2.10 |
| 0.13 | 2.28 |
| 0.14 | 2.45 |
| 0.15 | 2.63 |
| 0.16 | 2.80 |
| 0.17 | 2.98 |
| 0.18 | 3.15 |
| 0.19 | 3.33 |
| 0.2 | 3.51 |
| 0.21 | 3.68 |

Figure 4:
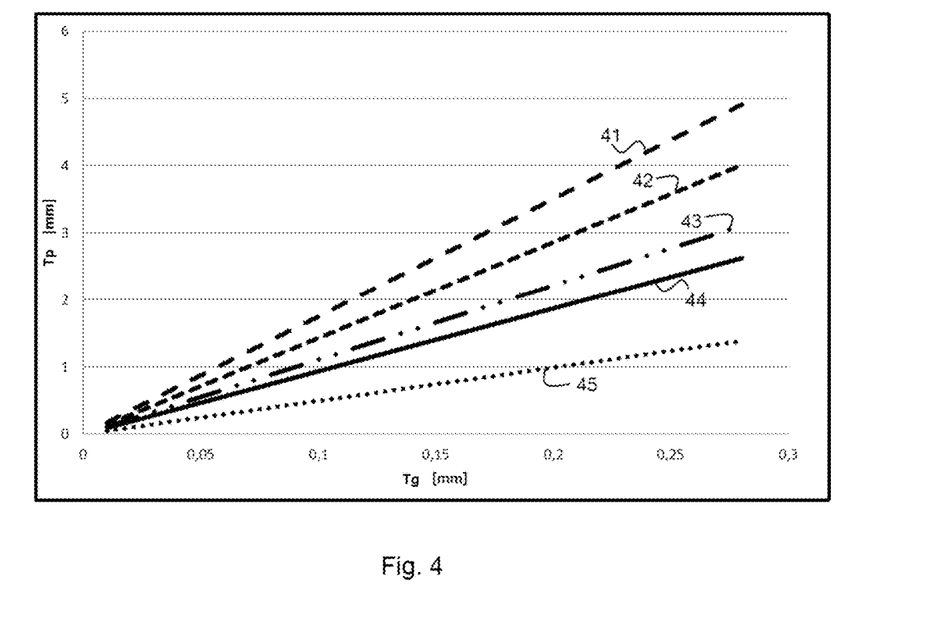
FIG. 4 shows thicknesses of the adherent foil as a function of the thickness of the thin-glass segments for various moduli of elasticity of the adherent foil, where the location of the neutral phase between tensile stress and compressive stress is in the adherent layer between adherent foil and thin-glass segments.

FIG. 4 shows various thicknesses of the adherent foil as a function of the thickness of the thin-glass substrates for different moduli of elasticity of various materials for the adherent foil. In all of these variants, the Poisson ratio of the adherent foil was 0.45, the Poisson ratio of the thin-glass segments was 0.23 and the modulus of elasticity of the thin-glass substrates was 73 GPa. The curve 41 shows the thickness function for an adherent foil with modulus of elasticity 0.2 GPa, corresponding to examples listed above. Curve 42 shows by way of example the thickness function for an adherent foil with modulus of elasticity 0.3 GPa, curve 43 shows by way of example the thickness function for an adherent foil with modulus of elasticity 0.5 GPa, curve 44 shows by way of example the thickness function for an adherent foil with modulus of elasticity 0.7 GPa and curve 45 shows by way of example the thickness function for an adherent foil with modulus of elasticity 2.5 GPa.

Figure 1B:
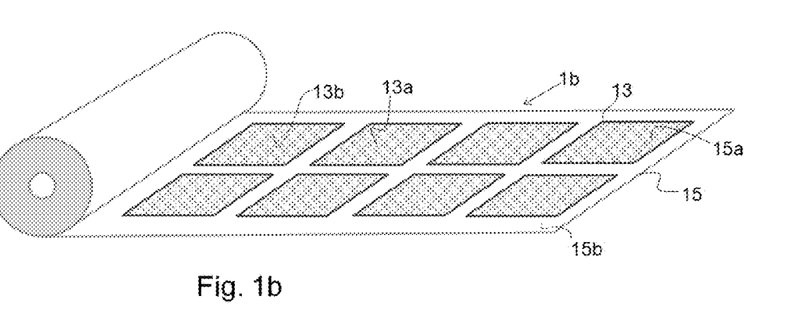

FIG. 1b correspondingly shows a glass substrate strip 1b with positioned and fixed square thin-glass segments 13 for manufacture of display panels. The thin-glass segments 13 with thickness 0.1 mm have been fixed on an adherent paper 15 with full-area contact of a first thin-glass surface 13b. The second thin-glass surface 13a is uncovered, facing upward, and comes into contact with the adherent foil 15, i.e. with the surface 15b of the adherent foil, only when the glass substrate strip 1b is rolled up. The adherent foil 15 is an adherent paper composed of a paper that has been coated with an adherent polyethylene layer and that is supplied by way of example as PE-CLING paper by Molco Deutschland GmbH, Schwerte. The coated side 15a of the adherent paper 15 is in contact with the first surface 13b of the thin-glass segments 13. The opposite non-adherent side 15b comes into contact with the second surface 13a of the thin-glass segments 13 when the glass substrate strip 1b is plated in an undulating fashion or is rolled up.

Figure 2A:
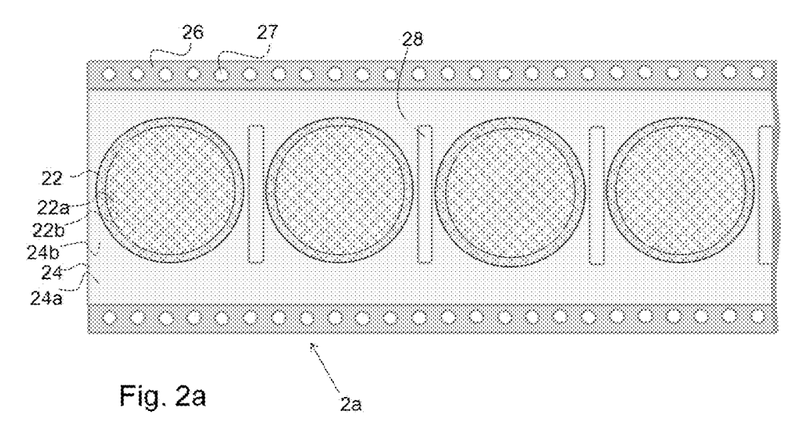

FIG. 2a corresponds to FIG. 1a in showing by way of example a glass substrate strip 2a with positioned and fixed round thin-glass segments 22 for manufacture of wafers. The thin-glass segments 22 here, thickness 0.7 mm, have been fixed on an adherent foil 24 with contact of the respective entire edge region of a first thin-glass surface 22b. The second thin-glass surface 22a is uncovered, facing upward, and comes into contact with the adherent foil 24 only when the glass substrate strip 2a is rolled up. The adherent foil 24 is a composite adherent foil polyethylene adherent foil made of polyethylene terephthalate (PET) and flexible polyvinyl chloride (flexible PVC) with thickness 290 µm, as is by way of example supplied as Penstick® Flex by Molco Deutschland GmbH, Schwerte. The adherent foil 24 has an adherent side 24a which comes into contact with the first surface 22b of the thin-glass segments 22, and has an opposite side 24b which comes into contact with the second surface 22a of the thin-glass segments 22 when the glass substrate strip 2a is plated in undulating fashion or is rolled up.

At the two lateral edges of the adherent foil protruding beyond the thin-glass segments 22 there is respectively a transport band 26 provided which can optionally have reinforcement by a backing foil. The transport band 26 serves for the guiding of the glass substrate strip 2a. The transport band can also have cutouts such as punched-out holes 27 for interlocking with a gearwheel or toothed belt, in order to improve guiding, if required by the drive mechanism and steering mechanism. Between the thin-glass segments 22 there are coding fields 28 on which a coding is attached, in order to determine the position of and/or to identify the individual thin-glass segments 22 in the production process. The coding can have been applied directly by printing, or inscribable or printable fields can have been applied for this purpose, for example in the form of labels on the adherent foil.

Figure 2B:
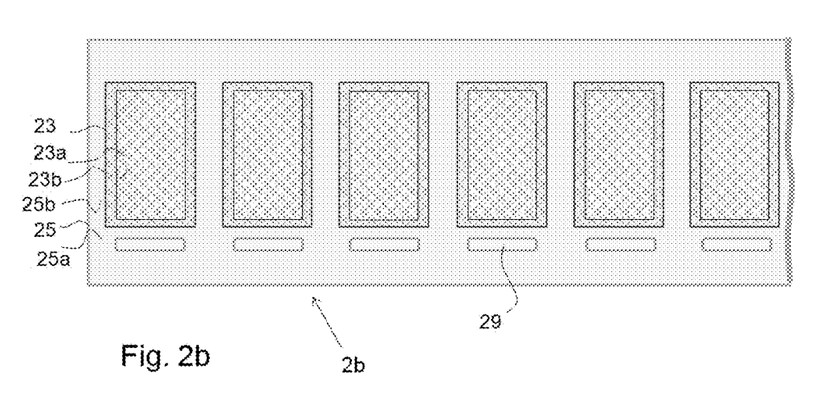

FIG. 2b correspondingly shows a glass substrate strip 2b with positioned and fixed square thin-glass segments 23 for manufacture of display panels. The thin-glass segments 23 have been fixed on an adherent foil 25 with contact of the respective entire edge region of a first thin-glass surface 23b. The second thin-glass surface 23a is uncovered, facing upward, and comes into contact with the adherent foil 25 only when the glass substrate strip 2b is rolled up. The adherent foil 25 is a flexible PVC adherent foil of thickness 150 µm, as is by way of example supplied as Penstick® Protect by Molco Deutschland GmbH, Schwerte. The static friction force of the adherent foil 25 is greater than 50 N. Its side 25a is in contact with the first surface 23b of the thin-glass segments 23, and its opposite side 25b comes into contact with the second surface 23a of the thin-glass segments 23 when the glass substrate strip 2b is plated in undulating fashion or is rolled up.

At the two lateral edges of the adherent foil protruding beyond the thin-glass segments 22 there are respectively coding fields 29 on which a coding is attached in order to determine the position of and/or to identify the individual thin-glass segments 23 in the production process. The coding can have been applied directly by printing, or inscribable or printable fields can have been applied for this purpose, for example in the form of labels on the adherent foil.

Figure 3A:
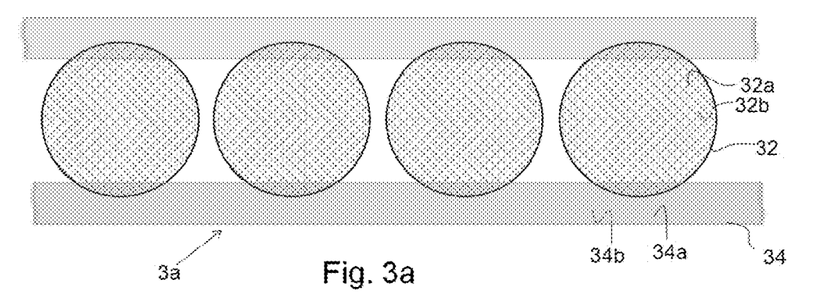

FIG. 3a corresponds to FIG. 2a in showing by way of example a glass substrate strip 3a with positioned and fixed round thin-glass segments 32 for manufacture of wafers. The thin-glass segments 32 here have been fixed on an adherent foil 34 with contact respectively two mutually opposite edge regions of a first thin-glass surface 32b. The second thin-glass surface 32a is uncovered, facing upward, and comes into contact with the adherent foil 34, i.e. with the outer foil 36 which forms the lower part of the adherent foil 34, only when the glass substrate strip 3a is rolled up. The adherent foil 34 is a flexible polyvinyl chloride (flexible PVC) adherent foil exhibiting a static friction force greater than 50 N and with thickness 150 µm, as is by way of example supplied as Penstick® Protect by Molco Deutschland GmbH, Schwerte. On the lower surface of the adherent flexible PVC material, a non-adherent outer foil 36 has been attached, by way of which the adherent foil 34 comes into contact with the second surface 32a of the thin-glass segments when the glass substrate strip 3a is plated in undulating form or is rolled up. FIG. 3c shows a cross section of the arrangement corresponding to FIG. 3a.

Figure 3B:
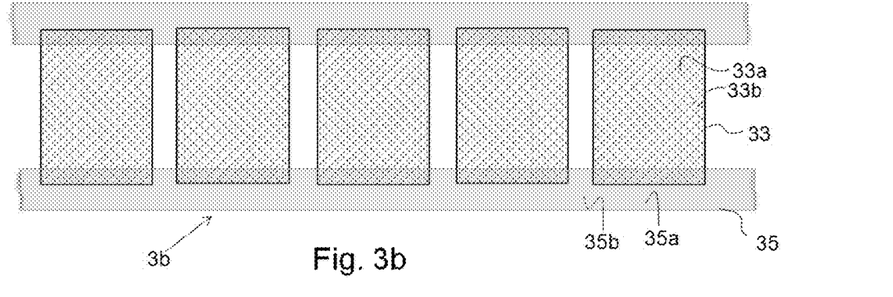
Figure 3C:
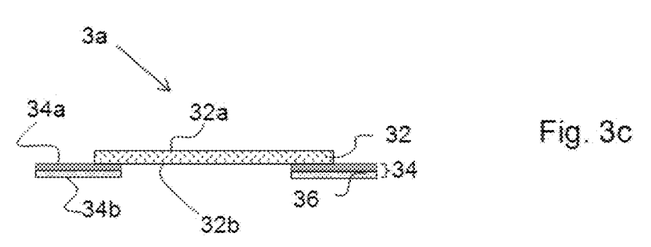
FIGS. 3c and 3d show respectively cross sections of the arrangements corresponding to FIGS. 3a and 3b.
Figure 3D:
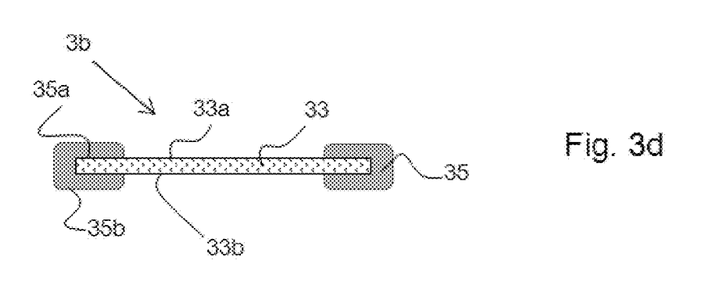

FIG. 3b corresponds to FIG. 2b in showing by way of example a glass substrate strip 3b with positioned and fixed square thin-glass segments 33 for manufacture of display panels. The thin-glass segments 33 here have been fixed on an adherent foil 35 with contact respectively two mutually opposite edge regions of a first thin-glass surface 33b and of a second thin-glass surface 33a. Here, either a second adherent foil (not shown) is placed onto the first adherent foil in such a way that the edge regions to be fixed of the thin-glass segments are then between two adherent foils or, as shown here, the adherent foil 35 is folded, from the edge, upward and around and placed inward around the edge region of the thin-glass surface 33a, in such a way that by way of its surface 35a it fixes the first surface 33b and the second surface 33a of the thin-glass segments. The adherent foil 35 is a flexible polyvinyl chloride (flexible PVC) adherent foil with thickness 150 µm, as is by way of example supplied as Penstick® Protect by Molco Deutschland GmbH, Schwerte. The adherent foil 35 is equally adherent on both surfaces and exhibits a static friction force greater than 50 N. FIG. 3d shows a cross section of the arrangement corresponding to FIG. 3b.

It is self-evident that the invention is not restricted to a combination of features described above, but that instead the person skilled in the art will combine all of the features of the invention as desired, to the extent that this is useful, or use all of the features of the invention singly, without exceeding the scope of the invention.

Key:

| | |
|---|---|
| 1a, 1b, 2a, 2b, 3a, 3b | Glass substrate strip |
| 12, 13, 22, 23, 32, 33 | Thin-glass segments |
| 12a, 13a, 22a, 23a, 32a, 33a | First surface of thin-glass segments |
| 12b, 13b, 22b, 23b, 32b, 33b | Second surface of thin-glass segments |
| 14, 15, 24, 25, 34, 35 | Adherent foil |
| 14a, 15a, 24a, 25a, 34a, 35a | First surface of adherent foil |
| 14b, 15b, 24b, 25b, 34b, 35b | Second surface of adherent foil |
| 26 | Transport band |
| 27 | Punched-out holes |
| 28, 29 | Coding field |
| 36 | Outer foil |
| 41, 42, 43, 44, 45 | Thickness values of adherent foil as a function of the thickness of the thin-glass segments for various moduli of elasticity of the adherent foil, where the location of the neutral phase between tensile stress and compressive stress is in the adherent layer between adherent foil and thin-glass segments. |

What is claimed is:

1. A glass substrate strip, comprising:
a thin-glass substrate with a first surface and a second surface; and
a polymer strip that is in contact with the first and/or second surface of the thin-glass substrate, the thin-glass substrate comprises an arrangement of at least two thin-glass segments, the polymer strip comprising an adherent foil, the thin-glass segments having a thickness that is less than or equal to 350 µm, the first and/or second surface having a squared average roughness value that is less than or equal to 1 nanometer, and the polymer strip having the thin-glass segments being layered in undulating fashion or being rolled up.

2. The glass substrate strip as claimed in claim 1, wherein the thickness of the thin-glass segments is less than or equal to 100 μm.

3. The glass substrate strip as claimed in claim 1, wherein the thickness of the thin-glass segments is less than or equal to 25 μm.

4. The glass substrate strip as claimed in claim 1, wherein the thickness of the thin-glass segments is at least 5 μm.

5. The glass substrate strip as claimed in claim 1, wherein the first and/or second surface comprises a fire-polished surface.

6. The glass substrate strip as claimed in claim 1, wherein the squared average roughness value is less than or equal to 0.8 nanometer.

7. The glass substrate strip as claimed in claim 1, wherein the thin-glass segments have an average roughness depth of at most 2 nanometers on the first and/or second surface.

8. The glass substrate strip as claimed in claim 1, wherein the adherent foil comprises a material selected from the group consisting of polyethylene, polyvinyl chloride, and flexible polyvinyl chloride, adherent textile, and a metal foil.

9. The glass substrate strip as claimed in claim 1, wherein the adherent foil has a thickness that is below 6 mm.

10. The glass substrate strip as claimed in claim 1, wherein the adherent foil has a thickness that is from 60 to 200 μm.

11. The glass substrate strip as claimed in claim 1, wherein the polymer strip having the thin-glass segments is rolled up and comprises a location of a neutral phase between tensile stress and compressive stress is in the adherent layer, wherein the adherent foil has a thickness that is determined as follows with reference to the thickness of the thin-glass segments (Tg), a Poisson ratio of the adherent foil (vp), a Poisson ratio of the thin-glass segments (vg), a modulus of elasticity of the adherent foil (Ep), and a modulus of elasticity of the thin-glass segments (Eg):

$$Tp = \sqrt{\frac{Eg}{Ep} \times \frac{1 - vp^2}{1 - vg^2}} \times Tg.$$

12. The glass substrate strip as claimed in claim 1, wherein the adherent foil covers an entirety of the first or second surfaces.

13. The glass substrate strip as claimed in claim 1, wherein the adherent foil covers sections of an edge region of the first and/or second surfaces.

14. The glass substrate strip as claimed in claim 13, wherein the adherent foil covers an entirety of the edge region of the first and/or second surfaces.

15. The glass substrate strip as claimed in claim 13, wherein the adherent foil protrudes beyond the edge region of the first and second surfaces perpendicularly to a longitudinal direction of the glass substrate strip and forms a protruding region.

16. The glass substrate strip as claimed in claim 15, wherein the protruding region has cutouts.

17. The glass substrate strip as claimed in claim 15, wherein the protruding region comprises coding fields.

18. The glass substrate strip as claimed in claim 13, wherein the glass substrate strip has coding fields between individual thin-glass segments.

19. The glass substrate strip as claimed in claim 1, wherein the adherent foil has stronger adhesive properties on a surface facing toward the first or second surface than on a surface facing away from the first or second surface.

* * * * *